United States Patent
Swenson et al.

(10) Patent No.: US 12,508,432 B2
(45) Date of Patent: Dec. 30, 2025

(54) CONFIGURABLE REPLACEMENT MECHANISM FOR LEADLESS PACEMAKER SYSTEM

(71) Applicant: BIOTRONIK SE & Co. KG, Berlin (DE)

(72) Inventors: Kurt Swenson, Dayton, OR (US); Hannes Kraetschmer, West Linn, OR (US); Brian M. Taff, Portland, OR (US); Dirk Muessig, West Linn, OR (US); Klaus Schmolinsky, Berlin (DE)

(73) Assignee: BIOTRONIK SE & Co. KG, Berlin (DE)

( * ) Notice: Subject to any disclaimer, the term of this patent is extended or adjusted under 35 U.S.C. 154(b) by 575 days.

(21) Appl. No.: 17/792,291

(22) PCT Filed: Jan. 14, 2021

(86) PCT No.: PCT/EP2021/050605
§ 371 (c)(1),
(2) Date: Jul. 12, 2022

(87) PCT Pub. No.: WO2021/144320
PCT Pub. Date: Jul. 22, 2021

(65) Prior Publication Data
US 2023/0057072 A1 Feb. 23, 2023

Related U.S. Application Data

(60) Provisional application No. 62/962,237, filed on Jan. 17, 2020.

(30) Foreign Application Priority Data

Mar. 31, 2020 (EP) .................................... 20167078

(51) Int. Cl.
A61N 1/372 (2006.01)
A61B 5/349 (2021.01)
A61N 1/375 (2006.01)

(52) U.S. Cl.
CPC .......... *A61N 1/37235* (2013.01); *A61B 5/349* (2021.01); *A61N 1/37288* (2013.01); *A61N 1/37512* (2017.08); *A61N 1/3756* (2013.01)

(58) Field of Classification Search
CPC ............ A61N 1/37235; A61N 1/37288; A61N 1/37512; A61N 1/3756; A61N 1/3956;
(Continued)

(56) References Cited

U.S. PATENT DOCUMENTS

2008/0021972 A1* 1/2008 Huelskamp .......... A61B 5/0031
607/60
2012/0197332 A1 8/2012 Peichel et al.
(Continued)

FOREIGN PATENT DOCUMENTS

EP 3082953 B1 1/2018
WO 2013080038 A2 6/2013

OTHER PUBLICATIONS

International Search Report (PCT/ISA/210) and Written Opinion (PCT/ISA/237) mailed on Apr. 7, 2021, by the European Patent Office as the International Searching Authority for International Application No. PCT/EP2021/050605.

*Primary Examiner* — Benjamin J Klein
*Assistant Examiner* — Daniel Tehrani
(74) *Attorney, Agent, or Firm* — Buchanan Ingersoll & Rooney PC

(57) ABSTRACT

The present invention relates to a system and method for replacing an implanted medical device with an implantable medical replacement device, wherein a programming device sends a command signal to the medical device to change an
(Continued)

address of the medical device to a new address being different from an address of the replacement device to allow independent communication of the programming device with both the medical device and the replacement device.

16 Claims, 3 Drawing Sheets

(58) Field of Classification Search
CPC .. A61N 1/362; A61N 1/39622; A61N 1/3684; A61N 1/3706; A61N 1/3622; A61N 1/37254; A61N 1/37264; A61N 2001/37294; A61B 5/349; H04B 13/005
See application file for complete search history.

(56) References Cited

U.S. PATENT DOCUMENTS

| | | |
|---|---|---|
| 2015/0174414 A1 | 6/2015 | Stahmann et al. |
| 2016/0038747 A1 | 2/2016 | Maile et al. |
| 2016/0121128 A1 | 5/2016 | Fishler et al. |
| 2018/0236249 A1 | 8/2018 | Klimovitch et al. |
| 2019/0386796 A1* | 12/2019 | Melodia .............. H04L 27/2626 |

* cited by examiner

CONFIGURABLE REPLACEMENT MECHANISM FOR LEADLESS PACEMAKER SYSTEM

CROSS-REFERENCE TO RELATED APPLICATIONS

This application is the United States National Phase under 35 U.S.C. § 371 of PCT International Patent Application No. PCT/EP2021/050605, filed on Jan. 14, 2021, which claims the benefit of European Patent Application No. 20167078.3, filed on Mar. 31, 2020 and U.S. Provisional Patent Application No. 62/962,237, filed on Jan. 17, 2020, the disclosures of which are hereby incorporated by reference herein in their entireties.

TECHNICAL FIELD

The present invention relates to a programming device, a medical system, and a method.

BACKGROUND

Once ERI for a cardiac implant, such as a leadless cardiac pacemaker, is declared (where ERI stands for elective replacement interval, i.e., the battery of the implant is nearing the depletion state), cardiac implants should be immediately replaced.

Particularly, in pacemaker dependent patients, the existing device (e.g., implantable leadless pacemaker) must be kept active right up to the time where the replacement device becomes active.

In the well-known leaded pacemaker, the replacement is done by opening the pocket where the pacemaker is located and quickly moving the leads from the existing implant to the new implant and then closing the pocket after removing the old implant. Since the endocardial end of the lead remains unchanged, it can be assumed that if the new implant was programmed the same as the old implant, therapy should continue without interruption.

With a leadless implant, there is no lead to move from one implant to the other. The new implant needs to be implanted in the heart in an inactive state so that it does not compete with the old device. Unlike with the unchanged lead, the electrode tissue interface associated the new leadless implant is untested at this point and may turn out to be inadequate for providing therapy. Testing of the new electrode placement needs to be coordinated with the old implant so that therapy will be interrupted for a minimal amount of time in case the placement is inadequate. Once the new placement passes, the old implant needs to be deactivated synchronous with activating the new implant.

Particularly, European Patent No. 3 082 953 B1 discloses an implantable medical device comprising a power manager configured to detect an end-of-life condition of the power source and, in response to detecting the end-of-life condition, to cause the deactivation element to at least partially disable the operational circuitry of the implantable medical device.

Furthermore, U.S. Publication No. 2012/0197332 A1 discloses a system comprising a first implantable medical device coupled to a first plurality of electrodes, wherein the first implantable medical device is configured to deliver therapeutic electrical stimulation to a patient via the first plurality of electrodes; and a second medical device coupled to a second plurality of electrodes, wherein the second medical device is configured to deliver therapeutic electrical stimulation to the patient via the second plurality of electrodes to inhibit the delivery of therapeutic electrical stimulation by the first implantable medical device; and modulate the therapeutic electrical stimulation delivered by the second implantable medical device according to a predetermined pattern to provide a disable command to the first implantable medical device, wherein the first implantable medical device is disabled in response to receipt of the disable command.

The present disclosure is directed toward overcoming one or more of the above-mentioned problems, though not necessarily limited to embodiments that do.

SUMMARY

Based on the foregoing it is an objective of the present invention to provide a programming device, a medical system and a method to allow safe systematic replacement of an implantable medical device, particularly of an implantable leadless cardiac pacemaker.

At least this objective is solved by a system having the features of claim 1 and a method having the features of claim 13. Preferred embodiments of the respective aspect of the present invention are stated in the corresponding sub claims and are described below.

According to claim 1, a programming device for replacing an implanted medical device with an implantable medical replacement device is disclosed, wherein the programming device is configured to send a command signal in a wireless fashion to the implanted medical device to change an address of the medical device to a new address being different from an address of the replacement device to allow independent communication of the programming device with both the medical device and the replacement device. Particularly, the programming device can be a portable device (e.g., hand-held device), e.g., a smart phone or a dedicated remote control.

According to an embodiment, the programming device conversely sends a command signal to the replacement device to change the address of the replacement device to one distinct from those affiliated with the medical device, wherein an added broadcast command or series of broadcast and device-specific commands may proceed the relay of the command signal to obtain addressing information from all medical devices (replacement or otherwise) accessible (either directly or indirectly) by the programming device.

Particularly, the implanted medical device comprises a battery that is discharged below a certain threshold and therefore needs to be displaced by the replacement device to ensure proper delivery of therapy to the patient.

Particularly, according to an embodiment of the programming device, a communication protocol is implemented in the programming device that allows configuring the address of the implanted medical device. Particularly, command signals will only be responded to by the medical device (or the replacement device or other medical devices of the system) if the respective command signal is explicitly targeted to the respective medical device (i.e., to the respective address).

Moreover, according to an embodiment of the present invention, the address is an integer value stored in the medical device. Upon receiving a message, the medical device compares the stored integer value to the value in the address field of the received message to determine whether the address is known. As a result, the medical device can determine whether it respond to the message or not.

In one embodiment, the commonly used address value (as delivered by the factory and used by active devices by convention) for this address is known to the programming device. The programming device may send a command using this address to inform the medical device to change its address such that multiple medical devices in a communications session can each have a session unique address. The active implant in this scheme should end the session with the commonly used address stored as its device address.

In a preferred embodiment, the programming device polls the devices in its communications proximity to find the unique factory assigned address for each device (could be the device's serial number). The programming device polls all devices using a broadcast address and some mechanism like timeslots or random delays is used to allow each device to return their unique identifier to the programming device. The programming device could then assign each medical device a unique session address using a command that is targeted to each medical device based on its unique identifier. This session address would then allow the programming device to send commands that identify the session address that is associated with the device that the message is intended for.

Furthermore, according to an embodiment of the programming device, the programming device comprises a communication protocol implemented in the programming device, wherein the communication protocol comprises a pre-defined broadcast address to which at least the medical device and the replacement device will respond to, independent of their assigned address. Particularly, all the devices of the considered system (e.g., the implanted medical device, the replacement device and particularly a further implanted medical device) will respond to command signals sent to the broadcast address by the programming device.

Particularly, such broadcast commands can be used to trigger concurrent actions on the part of multiple devices. Particularly, the implanted medical device can form part of a medical system comprising at least one further implanted medical device.

Particularly, the medical device and the further medical device can each be formed by an implantable leadless cardiac pacemaker, wherein one pacemaker can be implanted in the ventricle of the heart of the patient while the other pacemaker is implanted in the atrium of the heart (see below). Particularly, the respective implantable leadless cardiac pacemaker is understood to be a cardiac pacemaker that comprises a pacing electrode arranged on a housing of the pacemaker, wherein the housing is configured to be anchored to the heart wall (e.g., in the atrium or ventricle). Particularly, the housing encloses the battery of the leadless cardiac pacemaker. Thus, particularly, a leadless cardiac pacemaker does not comprise an elongated electrode lead.

Particularly, the respective leadless cardiac pacemaker can be configured to operate in an idle state in which the respective leadless cardiac pacemaker is configured to sense cardiac events, but is prevented from applying pacing pulses to the heart.

Further, in an embodiment, the programming device is configured to send an activation command signal to the replacement device to activate the replacement device to assume said idle state. Particularly, additional commands can be used to confirm that sensing is working appropriately. The additional commands can be sent by the programming device. According to an embodiment, the programming device is configured to send a command signal to the replacement device to configure it into an idle state.

Further, according to an embodiment of the programming device, wherein after having activated the replacement device to assume said idle state, the programming device is configured to send a further command signal to the replacement device to have the implanted replacement device apply pacing pulses at a particular rate to the heart of the patient for either: 1.) a pre-determined number of cardiac cycles (supporting pacing capture testing routines) or, 2.) (barring permanent programming of the replacement device) as a fixed ON-state condition that delivers therapy until an active communication link failure or a system-configurable timeout occurs. The intent of these configurations are to assess the device/patient electrical interactions associated with the replacement device but instate output from the replacement device only in temporary form until such engagements can be known to be stable and reliable. Until such conditions are known, the expiration of pacing output from the replacement device provides a fail-safe that avoids administering permanent therapy from the replacement device and relies on output from the device intended to be replaced (at least in a remedial form) as the means for bradycardia remediation.

Furthermore, in an embodiment, after having sent said further command signal to the replacement device, the programming device sends a command to the device intended to be replaced (i.e., the one with the newly assigned address) that effectively programs it to an out-of-the-way state. This out-of-the-way state employs a reduced therapy pacing rate (little better than an escape rhythm condition, i.e., 40 ppm) to offer basic pacing support and is augmented with an inhibit capability that halts output from the device targeted for replacement when it detects pacing output activity from the replacement device. While in active communication (or prior to the expiration of any relevant system-level time-outs), barring the receipt of explicit command input (from the Programmer) to do otherwise (e.g., a programming event), the implant targeted for replacement remains in this out-of-the way state to provide remedial bradycardia management support. Paired with the temporary outputs administered by the replacement device, the device targeted for replacement simply keeps the patient's heart pumping blood as a back-up only, providing no output in the presence of output from the replacement device. Servicing the aforementioned fail-safe approach, the device targeted for replacement reinstates its permanent program therapy output subject to link failure or relevant system-level timeouts effectively forcing system reversion to a no-harm, no-foul, last known good pre-change-out support condition.

Once reliable, viable pacing capture thresholds are determined for the replacement device the system facilitates instating permanent therapy output from the replacement device while also coordinating the permanent deactivation of the device targeted for replacement. The recommended sequence for such a change-over leans on the use of a permanent program write to the replacement device (where the clinician has an opportunity to adjust the intended therapy prior to transmitting it to the implant) followed by a subsequent, separate permanent program write to the device targeted for replacement that permanently deactivates it (rendering the device incapable of further communication). The system provides appropriate clinician warning prior to this permanent deactivation step as it represents a nonreversible process. The net result of the proceedings outlined above results in permanent program therapy output from the replacement device and a "bricking" of the device originally targeted for replacement such that is barred from any meaningful means to electrically interfere with the new replacement device's therapy output. (Note: This description assumes that viable sensing and impedance conditions also prevail and have been determined for the replacement device. Not explicitly mentioned in the description as a deliberate means to clarify the key merits of the present invention.)

According to an embodiment of the proposed system, the programming device is configured to send a command signal to the new address of the implantable medical device after having sent command signal. The command signal may configure the implantable medical device to a state wherein it employs a reduced therapy pacing rate and an inhibit capability that halts output from the device targeted for replacement when it detects pacing output activity from the replacement device. The implantable medical device may remain in said state while in active communication (or prior to the expiration of any relevant system-level time-outs), barring the receipt of explicit command input (from the programmer) to do otherwise (providing remedial, temporary bradycardia management support).

For instance, implantable cardiac pacemakers can be programmed so that in each cardiac cycle, the pacemaker monitors for an intrinsic sense signal for a time period. In case no sense is detected, the pacemaker applies pacing stimulation. When an old implantable device is present, it is programmed such that it waits longer to detect a sense (before a pacing stimulus is applied) than the new implantable device does. If the old implantable device detects a sense, pacing is inhibited.

Preferably, according to an embodiment, therapy is applied by the replacement device, while therapy is disabled in the former implantable device while in active communications.

The implanted medical device may form part of a single-chamber therapy system from the device targeted for replacement to a replacement device—the net result being that prior to the change-out, a single heart chamber was stimulated and that same chamber is stimulated afterwards, but simply using a replacement device.

Particularly, the programming device is configured to communicate with the (single-implant) medical device targeted for replacement using an inductive coupling telemetry path. Furthermore, the medical device is configured to detect when a command signal is directed to it by comparing the destination address in the command signal (or message) with an internally stored address, wherein the programming device is configured to send said command signal to the medical device that is interpreted by the medical device to change its address to the new address. Particularly, the replacement device (e.g., implantable leadless cardiac pacemaker) is implanted in the heart of the patient. Particularly, the programming device is configured to communicate with both implants, using the destination address to differentiate which one it is addressing. The replacement device (new implant) has a factory installed address.

Particularly, in the single-implant system the medical device can be an implantable leadless cardiac pacemaker, e.g., a VDD pacemaker that is implantable in a ventricle. It can be programmed by the programming device.

Furthermore, according to an alternative embodiment, the medical device forms part of a two-implant dual-chamber therapy system, wherein the two-implant system comprises a further medical device, wherein the medical device forms a master device and the further medical device forms a slave device, wherein the programming device is configured to send command signals to the slave device via the master device (e.g., the master device is configured to pass through command signals from the programming device to the slave device).

Alternatively, the medical device can form part of a two-implant dual-chamber therapy system, wherein the two-implant dual-chamber therapy system comprises a further medical device, wherein here the medical device forms a slave device and the further medical device forms a master device, wherein the programming device is configured to send the respective command signal to the slave device via the master device (e.g., the master device is configured to pass through command signals from the programming device to the slave device).

According to a further aspect of the present invention, a medical system is disclosed comprising a programming device according to the present invention, wherein the system further comprises an implantable medical device to be replaced and/or an implantable medical replacement device for replacing the medical device.

Particularly, according to an embodiment of the system, the programming device comprises a communication protocol implemented in the programming device, wherein the communication protocol comprises a pre-defined broadcast address to which at least the medical device and the replacement device will respond to, independent of their assigned address.

According to an embodiment of the present invention, communication protocols are implemented in every device in the system which is configured to communicate with at least one other device.

Particularly, all the devices of the considered system (e.g., the implanted medical device, the replacement device and particularly a further implanted medical device, see below) are configured to respond to command signals sent to the broadcast address by the programming device.

According to an embodiment of the system, the medical device is an implantable leadless cardiac pacemaker that is implantable into the heart of a patient, and wherein the replacement device is an implantable leadless cardiac pacemaker, too, wherein the replacement device is configured to operate in an idle state in which it is configured to sense cardiac events, but is prevented from applying pacing pulses to the heart.

Furthermore, according to an embodiment of the system, the programming device is configured to send an activation command signal to the replacement device, wherein the replacement device is configured to be activated to assume said idle state upon receipt of the activation command signal. As described before, additional commands may be used to confirm that sensing is working appropriately.

Furthermore, according to an embodiment of the system, after having activated the replacement device to assume said idle state, the programming device is configured to send a further command signal to the replacement device, wherein the implanted replacement is configured to apply pacing pulses at a particular rate to the heart of the patient for a pre-determined number of cardiac cycles when receiving said further command signal.

Furthermore, according to an embodiment of the system, after having sent said further command signal, the programming device is configured to send a command signal to the new address of the implanted medical device, wherein the implanted medical device is configured to inhibit application of pacing pulses of the implanted medical device to the heart of the patient when it detects heart activity at a rate corresponding with the rate of the replacement device or faster for a predetermined number of cardiac cycles when receiving said suspension command signal.

According to an embodiment of the proposed system, the programming device sends a permanent deactivation command signal to the new address of the implanted medical device in cases a user has acknowledged and/or confirmed viable capture of the patient's heart from the replacement device. In an embodiment, the permanent deactivation affects the implanted medical device such that it is no longer sensing, communicating, or providing paced output to avoid electrically interfering with therapy output from the replacement device.

According to an embodiment, the programming device is configured to send a permanent deactivation command signal to the new address of the implanted medical device in case a capture of a patient's heart is acknowledged or confirmed by the replacement device.

Furthermore, according to an embodiment of the system, the programming device is configured to send a deactivation command signal to the new address of the implanted medical device in case capture of the heart of the patient is detected by the implanted replacement device with respect to the pacing pulses applied by the replacement device, wherein the implanted medical device is configured to be deactivated, particularly when active communication is terminated, when the medial device receives said deactivation command signal.

Furthermore, according to an embodiment of the system, the programming device is configured to send an activation command signal to the implanted replacement device, particularly when active communication is terminated, wherein the replacement device is configured to be activated when receiving said activation command signal. Particularly, if either device (i.e., the medical device to be replaced or the replacement device) fails to acknowledge the deactivation/activation command, the programming device can be configured to resent the respective command signal before communication is terminated.

According to an embodiment of the system, the (implanted) medical device (e.g., an implantable leadless cardiac pacemaker, see also above) forms the only implant of the system. Particularly, in an embodiment of the system, the programming device is configured to communicate with the (single) medical device using an inductive coupling telemetry path. Furthermore, the medical device is configured to detect when a command signal is directed to it by comparing the destination address in the command signal (or message) with an internally stored address, wherein the programming device is configured to send said command signal to the medical device that is interpreted by the medical device to change its address to the new address.

Furthermore, according to an embodiment of the system, the system comprises a further implantable medical device. Preferably, each of the medical devices is an implantable leadless cardiac pacemaker. Particularly, in an embodiment, the system comprises a leadless cardiac pacemaker in the right atrium and a leadless pacemaker in the right ventricle. Together, they can form a DDI or DDD pacemaker system. When the system comprises more than one implantable medical device, the programming device is configured to only communicate directly with one of them, the master device. The master device is configured to communicate with the other implantable medical device, the slave device, in order to configure it. In a preferred embodiment, the programming device communicates with the master device using inductive communications.

Further, according to an embodiment, the master device and the slave device are configured to communicate with each other using an independent communication system such as an impedance- or ultrasonic-based physical network layer. Particularly, in an embodiment of the system, each medical device may comprise a communication unit configured to generate messages in the form of ultrasound signals. This means that the telemetry head (e.g., wand) of the programming device only needs to be placed in the optimal position for communicating with the master device and not in a compromised position necessary to bring both medical devices in range at the same time.

Further, according to an embodiment of the system, the medical device forms a master device and the further medical device forms a slave device, wherein the programming device is configured to send command signals to the slave device via the master device, wherein the master device is configured to pass through command signals from the programming device to the slave device. In this embodiment, the master device is to be replaced by the replacement device.

According to an alternative embodiment of the system, the slave device is to be replaced by the replacement device, i.e., the medical device forms a slave device and the further medical device forms a master device, wherein the programming device is configured to send the respective command signal to the slave device via the master device, wherein the master device is configured to pass through command signals from the programming device to the slave device.

Further, according to yet another aspect of the present invention, a method for replacing an implanted medical device with an implantable medical replacement device is disclosed, wherein a command signal is sent with a programming device in a wireless fashion to the implanted medical device to change an address of the medical device to a new address being different from an address of the replacement device to allow independent communication of the programming device with both the medical device and the replacement device, and wherein an activation command signal is sent by the programming device to the replacement device to activate the replacement device to assume an idle state in which the replacement device is configured to sense cardiac events, but is prevented from applying pacing pulses to the heart, and wherein after having activated the replacement device to assume said idle state, a further command signal is sent by the programming device to the replacement device to let the implanted replacement device apply pacing pulses to the heart of the patient for either: 1.) a predetermined number of cardiac cycles (supporting pacing capture testing routines) or, 2.) (barring permanent programming of the replacement device) as a fixed ON-state condition that delivers therapy until an active communication link failure or a system-configurable timeout occurs, and wherein a command signal is sent by the programming device to the new address of the implanted medical device to drive it at a temporary out-of-the-way state where it administers low rate pacing that is inhibited by the sensing of pacing pulses associated with the replacement device (or faster intrinsic rates), and wherein an activation command signal is sent to the implanted replacement medical device by the programming device to activate the replacement device to start to apply a clinician-configured permanent program therapy support in cases where the clinician confirms that viable pacing capture thresholds have been realized at the implantation site of replacement device, and wherein a permanent deactivation command signal is sent by the programming device to the new address of the medical device.

The intent of this method is to assess the device/patient electrical interactions associated with the replacement device but instate output from the replacement device only in temporary form until such engagements can be known to be stable and reliable. Until such conditions are known, the expiration of pacing output from the replacement device provides a fail-safe that avoids administering permanent therapy from the replacement device and relies on output from the device intended to be replaced (at least in a remedial form) as the means for bradycardia remediation. Once robust capture has been confirmed at the replacement device implantation site, the method instates permanent therapy from the replacement device and permanently disables the device originally targeted for replacement. This method thus transitions therapy output to the replacement device once it is known to provide an avenue for viable support while subsequently "bricking" the device originally targeted for replacement eliminating its potential to electrically interfere with therapy output from the new device.

According to an embodiment of the method, the medical device is an implantable leadless cardiac pacemaker that is implantable into the heart of a patient, and wherein the replacement device is an implantable leadless cardiac pacemaker, too, wherein the replacement device is configured to operate in an idle state in which it is configured to sense cardiac events, but is prevented from applying pacing pulses to the heart.

According to a further embodiment of the method, the implanted medical device may form part of a single-implant therapy system in leveraging the concepts detailed within the present invention to transition therapy from the device targeted for replacement to a replacement device—the net result being that prior to the change-out, a single heart chamber was stimulated and that same chamber is stimulated afterwards, but simply using a replacement device. Preferably, the implant may reside in the patient's, ventricle, atrium, or potentially other locations.

According to an aspect of the present invention, a system and method for an automatic transfer of the stimulation function from an implanted medical device to an implantable medical replacement device is proposed, wherein the transfer is programmer-assisted. The present invention is directed to cases where a replacement of an implanted medical device to a replacement device is necessary. The proposed system and method is especially useful for pacemaker-dependent patients.

The proposed system and method comprises programming the implanted medical device and the replacement device, wherein stimulation function is automatically switched from an implanted medical device to an implantable medical replacement device.

According to one example, the implanted medical device and the implantable medical replacement device are both implantable leadless pacemakers ("implanted leadless pacemaker" and "replacement leadless pacemaker" in the following).

The procedure for replacing an old leadless pacemaker with a new one is completely different to the procedure for replacing a conventional pacemaker with leads. For a conventional pacemaker, the intracardiac leads stay in the patient and only the device housing is replaced, whereby the old leads are reconnected with the new device housing. Once a leadless pacemaker needs to be replaced, a completely new leadless pacemaker would be implanted, while the old device stays in the patient. Especially for pacemaker-dependent patients, the therapy function needs to be ensured during the replacement procedure.

A solution to the problem is proposed in the form of a programmer-controlled, suitable programming sequence for an implanted medical device ("implanted device") and an implantable medical replacement device ("replacement device").

An embodiment of the present invention is developed such that, after implantation of the replacement device and while the implanted device is still active, the programmer interrogates the implanted device and replacement device. The replacement device is initially programmed to a temporary configuration suitable for the patient. The programming configuration of the implanted device is then adapted by the replacement device in a transfer procedure. For the transfer procedure, the replacement device is first triggered to perform overdrive pacing to the tissue (e.g., stimulation rate of replacement device is 5 to 10 bpm faster than a basic rate determined by the implanted device), while the implanted device is switched to inhibit stimulation.

In the case of success, i.e., after performing the transfer procedure, the replacement device effectively stimulates the tissue, the temporary configuration of the replacement device is set permanent, the replacement device is configured to stimulate with the basic interval, and the stimulation the implanted device is switched off.

According to an embodiment, for the implantation of the replacement device before the stimulation configuration is done by the programmer, the replacement device is set to a special mode, in which the device is ready for use, but where stimulation functions and automatic implantation detection are disabled.

Preferably, according to aspects of the present invention, the programmer must be able to handle two valid session keys (one from the implanted device, one from the replacement device simultaneously) in this procedure.

According to embodiments, the procedure can be as follows:

The programmer successively interrogates both implants in an uninterruptible sequence:

1. Interrogation command for implanted device:
   a. Replacement device does not respond to this command in the special mode.
   b. Programmer saves complete program from implanted device.
2. Special interrogation command follows for replacement device which is ignored by implanted device.

The programmer maintains a communication connection to the two implants.

According to an embodiment, if the stimulation function of the implanted device is inhibited, the programmer configures the implanted device to a temporary program. In the temporary program, the implanted device applies stimulation paces with a rate which is 5 to 10 bpm faster than a basic interval, until safe pacing is achieved. The corresponding frequency to the shortened interval is a suitable overdrive pacing interval (ODSI) that allows the replacement device to be subsequently programmed.

The programmer terminates the temporary overdrive pacing for the implanted device by incrementally extending the baseline interval until the implanted device is safely inhibited again.

In case the implanted device is not inhibited, an ODSI is calculated: programmed basic rate of implanted device+10 bpm.

Then the programmer starts an R-wave-synchronized temporary program (relative to implanted device) in the replacement device with all program parameters of implanted device, but with the following exception: The basic rate is increased by the ODSI (compared to basic interval of the implanted device), which therefore serves as safe overdrive stimulation.

This will immediately inhibit the implanted device (if not already intrinsic) and the replacement device will now take over the stimulation. The programmer may start an automatic threshold test via the replacement device, set a stimulation threshold and complete the implantation detection.

If no valid threshold is found, the programmer repeats the search. In case the threshold test still fails, the programmer terminates the temporary program in the replacement device and sets the replacement device back to the special mode. The implanted device is resumed to stimulation or is inhibited.

A corresponding user message is displayed on the screen to prompt the operator, e.g., to reposition the replacement device.

If a valid threshold is found, the programmer defines the temporary program as permanent program to the replacement device, initially with overdrive pacing. This still keeps implanted device inhibited.

Afterwards (and only after the replacement device acknowledged the permanent program), the implanted device is permanently deactivated by the programmer with a special command.

With described systems and methods, the stimulation configuration of the implanted device can be transferred to replacement device. Any interruption of the communication between programmer and the replacement device and/or the implanted device would lead to termination of the temporary program in the replacement device (return to the special mode), wherein the implanted device would again be paced or inhibited at fundamental frequency.

Another command sequence from the programmer to the replacement device would stop overdrive pacing in replacement device by gradually returning the rate back to the basic rate. The replacement device then stimulates at basal rate or is inhibited.

All programming is provided with appropriate repetitions to be sufficiently robust to interference.

According to a further alternative embodiment of the method, the medical device forms part of a two-implant dual-chamber therapy system, wherein the two-implant system comprises a further medical device, and wherein the medical device forms a slave device and the further medical device forms a master device. Particularly, the respective master device passes through the respective command signal from the programming device to the slave device.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

In the following embodiments, features and advantages of the present invention shall be explained with reference to the Figures, wherein.

DETAILED DESCRIPTION

Figure 1:
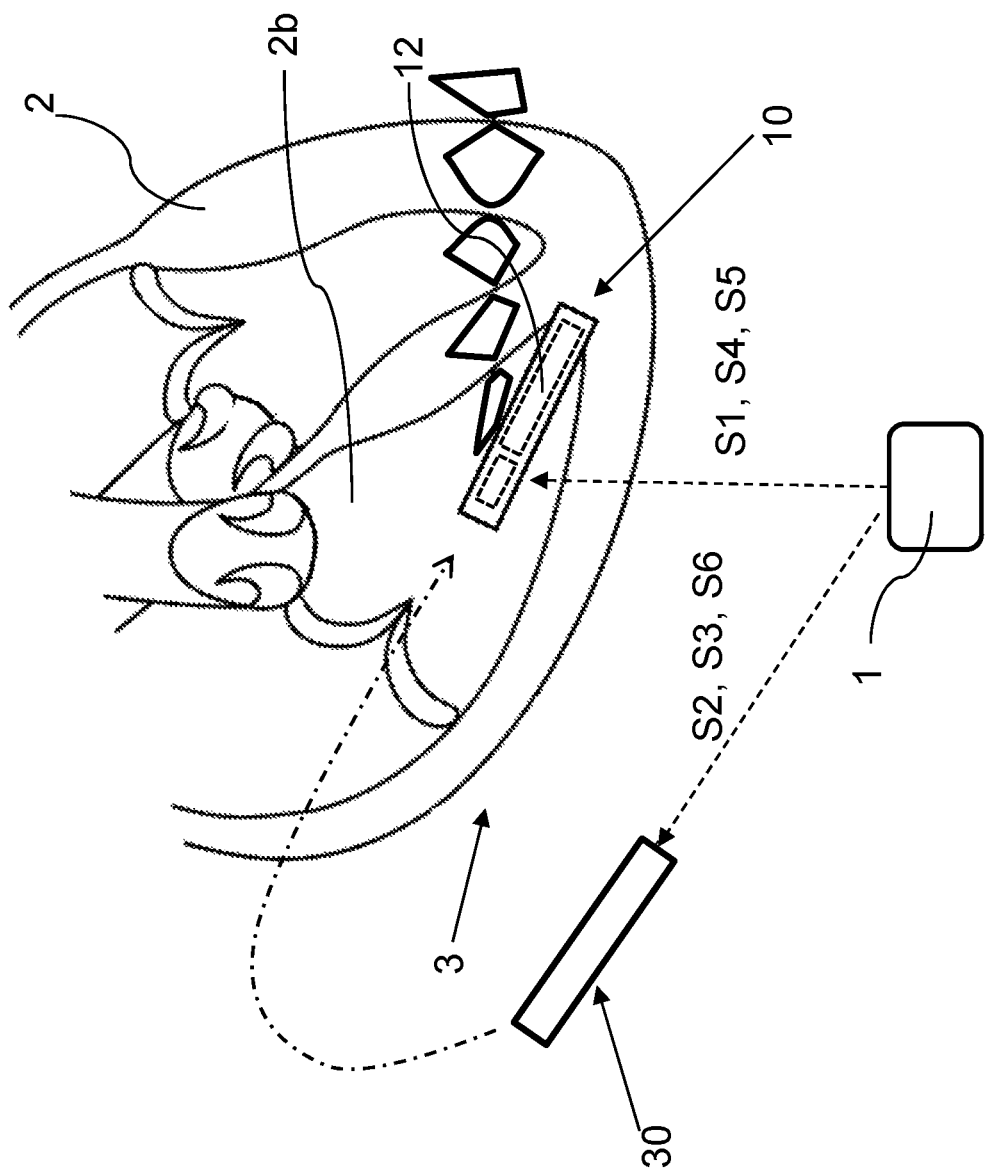
FIG. 1 shows a schematic illustration of an embodiment of a programming device and medical system according to the present invention, wherein a medical device is replaced by a replacement device in a single-implant system.

FIG. 1 shows an embodiment of a programming device 1 according to the present invention for replacing an implanted medical device 10 with an implantable medical replacement device 30, wherein the programming device 1 is configured to send a command signal S1 to the medical device 10 to be replaced to change an address of the medical device 10 to a new address being different from an address of the replacement device 30 to allow independent communication of the programming device 1 with both the medical device 10 to be replaced and the replacement device 30.

Figure 2:
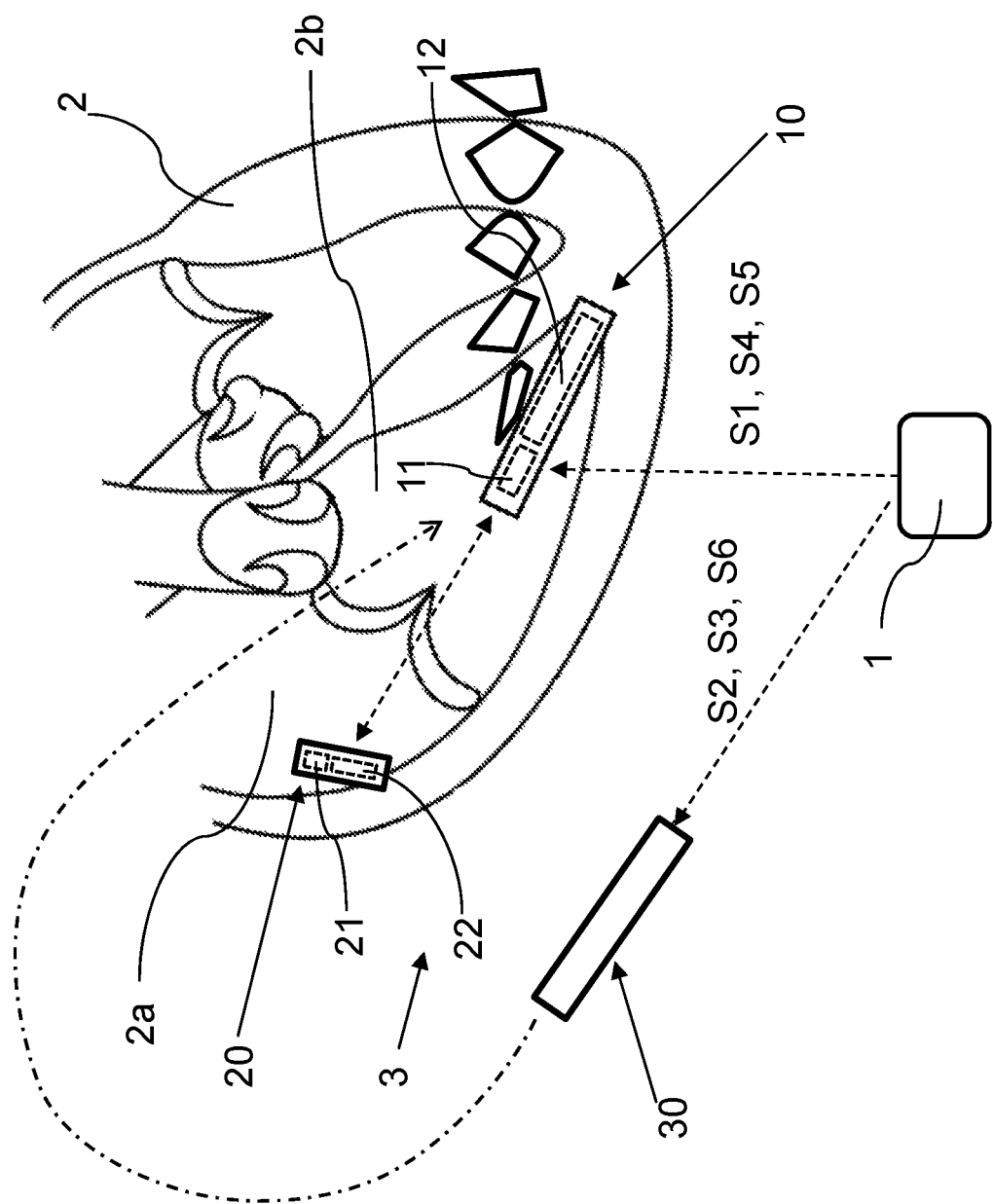
FIG. 2 shows a further embodiment of the present invention, wherein a master device of a two-implant system is replaced.
Figure 3:
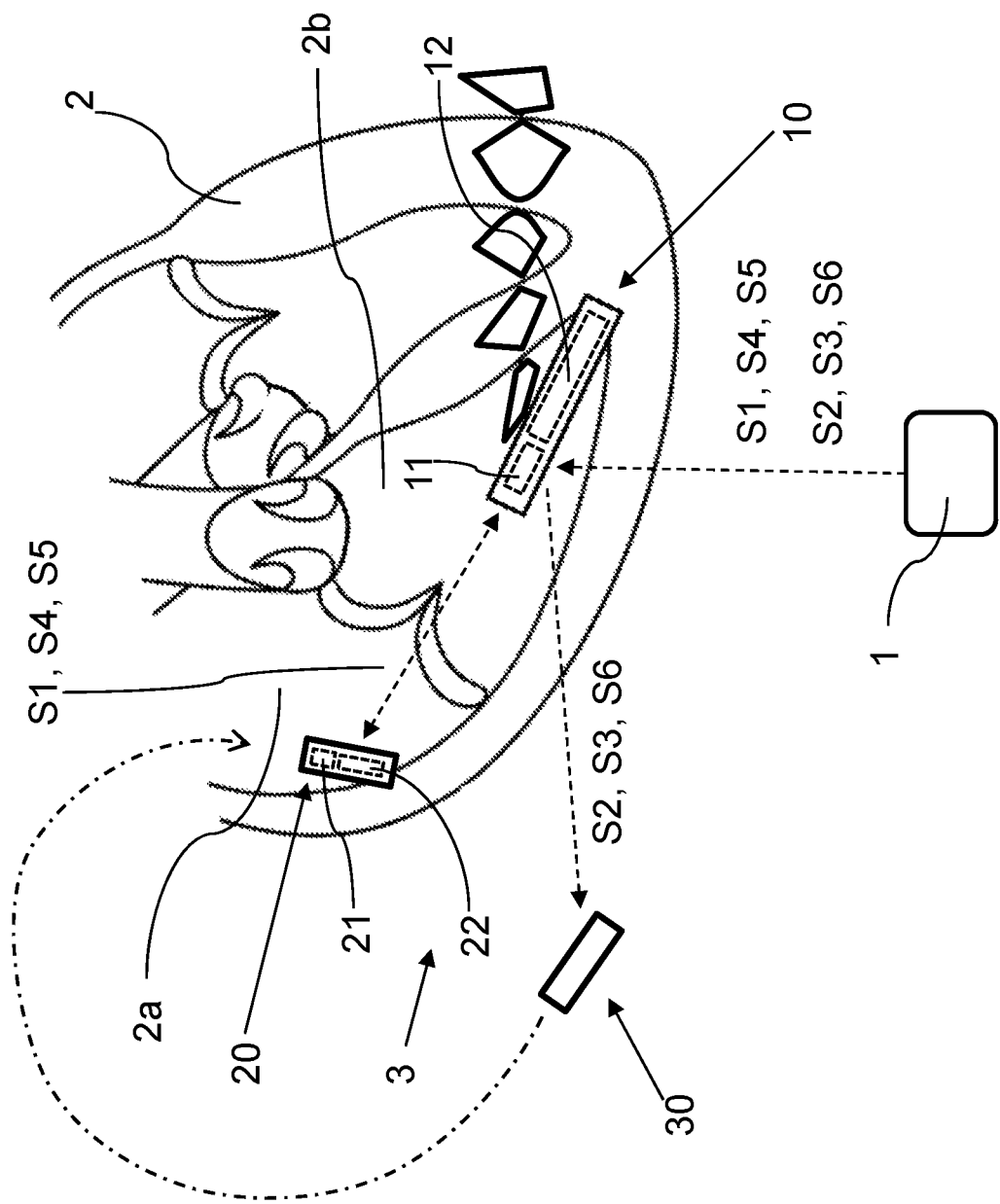
FIG. 3 shows a further embodiment of the present invention, wherein a slave device of a two-implant system is replaced.

As shown in FIG. 1, the present invention can be used to replace a medical device 10, e.g., a leadless pacemaker 10 implanted in the ventricle 2b of a heart 2 of a patient, that can constitute a single-implant system. Alternatively, as shown in FIGS. 2 and 3, the present invention may also be used to replace one of, e.g., two medical devices 10, 20 of a two-implant system. Here, one of the medical devices 10, 20 can be a leadless pacemaker 10 implanted in the ventricle 2b while the other medical device 20 can be a leadless pacemaker 20 implanted in the atrium 2a. Particularly, the pacemaker 10 implanted in the ventricle 2b forms a master device while the other pacemaker 20 forms a slave device.

Particularly, according to an embodiment, the present invention is based on the idea to use a logic-based communication protocol and command processor that includes a configurable receiver address. Particularly, command signals will only be responded to if the command signal is explicitly targeted to that device 10, 20, 30. Preferably, all implants 10, 20, 30 for a particular chamber 2a, 2b will be delivered with a factory default address, which will be automatically used until changed. A command signal S1 will be supported that will change the address of a device 10 or 20 to be replaced (e.g., upon depletion of a battery 12, 22 of the device 10 or 20 in question) to an alternative one, denoted as new address. When a replacement device 30 is to be implanted, the depleted devices 10, 20 address will first be changed to the new address. The programming device 1 can then communicate independently with both the depleted device 10 or 20 and the replacement device 30. This will allow command signals to be directed to each of the devices 10 or 20, 30 to support the role of that device in the operation. The communication protocol will include a predefined broadcast address or addresses that all devices 10, 20, 30 will respond to, independent of their assigned address. Such broadcast commands can be used to trigger concurrent actions on the part of multiple devices.

According to an embodiment, the programming device 1 conversely sends a command signal S1 to the replacement device 30 to change the address of the replacement device to one distinct from those affiliated with the medical device 10, 20, wherein an added broadcast command or series of broadcast and device-specific commands (S0, not explicitly shown in any of the figures) may proceed the relay of S1 to obtain addressing information from all medical devices (replacement or otherwise) accessible (either directly or indirectly) by the programming device 1.

Factory fresh devices will preferably always be delivered in a deactivated mode. As indicated in FIG. 1, the replacement device 30 will first be activated by a command signal S2 of the programming device 1 in an idle state where therapy is suspended but sensing is active. Additional command signals can be used to confirm that sensing is working appropriately. Then a command signal S4 will be issued to the implanted device 10 to configure it to an out-of-the-way state where it delivers therapy at a low basic rate and is inhibited by detected activity from the heart or the replacement device. Next a command signal S3 is issued to the replacement device either have it start pacing for a predetermined number of cardiac cycles (capture threshold test mode) or to have it turn to an ON-state pacing output that remains active in accordance with either an active communication condition and/or a relevant timeout. If capture is detected when the replacement device 30 paces, then the clinician will use the programmer to configure an appropriate permanent pacing therapy for the replacement device and subsequently issue a command signal S6 that tells the replacement device 30 to pace with the new settings. The clinician is then given opportunity to permanently deactivate the implant originally targeted for replacement and uses command S5 to do so.

As described above in conjunction with FIG. 1, the present invention can be used to replace a single medical device 10 of a single-implant system (which is shown in the ventricle in FIG. 1, but may reside in the atrium in other possible embodiments). Alternatively, replacement of a master device 10 (which in FIGS. 2 & 3 is shown in the ventricle, but may reside in the atrium or elsewhere in other possible embodiments) or of a partnered slave device 20 (which in FIGS. 2 & 3 stationed in the atrium, but may reside in the ventricle or elsewhere in other possible embodiments) can be accomplished in a two-implant system using the present invention which will be described in the following with reference to FIGS. 2 and 3.

Particularly, a single-implant system as shown in FIG. 1 has a leadless implant 10 in a single cardiac chamber 2b, e.g., a VDD implant that goes in the ventricle 2b (which one notes is a dual-chamber therapy implemented using a single-implant system). It will be programmed by the external programming device 1. A typical two implant system, as shown in FIGS. 2 and 3, may have a leadless pacemaker 20 in the right atrium 2a and one (10) in the right ventricle 2b. Together, they can make up a DDI or DDD pacemaker system. When there is more than one implant 10, 20 in the system 2, the programming device 1 will preferably only communicate directly with one of them, the master device 10. The master 10 will communicate with the other implant 20, the slave device 20, in order to configure it. In the preferred implementation, the programming device 1 communicates with the master 10 using, e.g., inductive communications and the master and slave devices 10, 20 will communicate with each other using an independent communications system such as an impedance- or ultrasonic-based physical network layer. For this, both devices 10, 20 may comprise corresponding communication units 11, 21. This means that a telemetry head (wand) of the programming device 1 only needs to be placed in the optimal position for communicating with the master 10 and not in a compromised position necessary to simultaneous bring both implants 10, 20 in range at the same time.

For the single implant system as shown in FIG. 1, the programming device 1 communicates with the single medical device 10 using, e.g., an inductive coupling telemetry path. The logic in the medical device 10 detects when the message (e.g., command signal) is directed to it by comparing the destination address in the message with its internally stored address. A command signal S1 is sent that is interpreted by the implant's 10 hardware command processor to change its address to the new address. The replacement device 30 is positioned in the heart 2 as indicated by the arrow in FIG. 1. The programming device 1 communicates with both devices 10, 30 using the destination address to differentiate which one it is addressing. The replacement device 30 has the factory installed address.

For the replacement of a master device 10 in a two-implant system as shown in FIG. 2, the same procedure can be followed as is described above for the single-implant system. The master and slave status in a particular device for the purpose of passing through communications from the programming device 1 could either be pre-configured at the factory or could be configurable as part of the setup of the device 10. The master 10 could just represent the ability to pass commands through to another device 20, which would make the programming device 1 be the device that contains the bulk of the replacement algorithm, or the master 10 could have the details for the replacement algorithm built into the commands that its command processor knows how to handle. The slave device 20 does not use the inductive telemetry system, so it is not affected by the process.

For the replacement of a slave device 20, as shown in FIG. 3, the programming device 1 sends commands (e.g., S1 to S6) to the master device 10 using the inductive telemetry system to initiate the replacement. The master 10 acts as a relay device between the programming device 1 and the slave device 20 by responding to inductive commands that cause it to send intra-cardiac commands (using, e.g., the impedance, ultrasonic, or other non-inductive physical layer telemetry system 11, 21) to the slave 20. The master 10 sends a command S1 to the slave device 20 to tell it to change to the new address. The new slave (replacement device 30) is implanted in the atrium 2a (see arrow) and activated in the idle state by means of a command signal S2 of the programming device 1. It has the factory default address. The impedance, ultrasonic, or other non-inductive physical layer messages are received by both slave devices 20, 30, but each one only responds to commands that match its address. The old slave 20 is set to a temporary "out-of-the-way" state that offers only remedial backup pacing using S4 transmission from the programmer 1 to the master 10, which relays said messaging to the slave 20. The new replacement slave 30 is tested by sending a command signal S3 to the new slave 30 (again by passing it through the master 10) to let it pace while the old slave 20 is inhibited from pacing by the presence of the higher rate output from 30. If the new slave 30 demonstrates viable tissue engagement and pacing capture conditions, the new slave is configured to a new permanent program status that delivers therapy from 30 using S6 (again, passed from the Programmer through the master 10). Last, in coordination with appropriate clinical warnings the old slave 20 is permanently deactivated (by receiving command signal S5 from the programming device via master 10). Ideally the administration of the new permanent program within 30 and the permanent deactivation of 20 occurs as a smooth, coordinated process.

Particularly, the present invention provides a programming system combining the information from multiple implanted devices in a single GUI so the user can review and adjust parameters across the replacement device and the device targeted for replacement in a coordinated manner. Such support may take the form of displaying side-by-side program parameter settings affiliated with the two devices to readily highlight differences, ease transfer, and enable user adjustment—an approach vastly preferred to embodiments that force clinicians to myopically and sequentially communicate with each device wherein users would be required to remember or document (outside of the GUI) settings from one implant to ensure proper conditions in the other. (Note: Such a user control configuration does not mean that the Programmer is forced to simultaneously send messaging to two implants. The same mechanism can be applied in other systems with multiple interacting implantable medical devices (IMD).

Thus, the present invention allows a safe replacement procedure with testing before activating of the new device and deactivation of the old device. Particularly, the use of a master device to program a slave device via intra-cardiac communication allows the programmer wand to be positioned in the best place to communicate only with the master 10.

Concurrent connection and addressable commands allow the programming device 1 to coordinate the configuration and operation of multiple devices 10, 20, 30 without needing to prevent the communications to be received and acted upon by unintended devices in the system.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. A system comprising: an implantable medical device, an implantable medical replacement device, and a programming device for replacing the implantable medical device with the implantable medical replacement device using the programming device, wherein the programming device is configured to send a command signal to the implantable medical device to change an address of the implantable medical device to a new address being different from an address of the implantable medical replacement device to allow independent communication of the programming device with both the implantable medical device and the implantable medical replacement device, to send a further command signal to the implantable medical replacement device, wherein the further command signal is configured to let the implantable medical replacement device apply pacing pulses to the heart of the patient for a predetermined number of cardiac cycles, and to send a permanent deactivation command signal to the new address of the implantable medical device in case a capture of a patient's heart is acknowledged or confirmed by the implantable medical replacement device.

2. The system according to claim 1, wherein the programming device controls a communication protocol, wherein the communication protocol includes a pre-defined broadcast address to which at least the implantable medical device and the implantable medical replacement device will respond to, independent of their assigned address.

3. The system according to claim 1, wherein the programming device sends a command signal to the implantable medical replacement device to change the address of the implantable medical replacement device to one distinct from the address of the medical device.

4. The system according to claim 1, wherein the implantable medical device is a first implantable leadless cardiac pacemaker that is implantable into the heart of a patient, and wherein the implantable medical replacement device is a second implantable leadless cardiac pacemaker, wherein the implantable medical replacement device is configured to operate in an idle state in which the implantable medical replacement device is configured to sense cardiac events, but prevented from applying pacing pulses to the heart.

5. The system according to claim 4, wherein the programming device is configured to send a command signal to the implantable medical replacement device to configure it into an idle state.

6. The system according to claim 5, wherein the programming device is configured to send a command signal to the new address of the implantable medical device after sending the command signal.

7. The system according to claim 6, wherein the programming device is configured to send a command signal to the implantable medical replacement device to activate the implantable medical replacement device.

8. The system according to claim 1, wherein the implantable medical device forms part of a single implant system in which the implantable medical device is the only implantable medical device of the system.

9. The system according to claim 1, wherein the medical device forms a master device and the further medical device forms a slave device, wherein the programming device is configured to send command signals to the slave device via the master device.

10. The system according to claim 1, wherein the medical device forms a slave device and the further medical device forms a master device, wherein the programming device is configured to send the respective command signal to the slave device via the master device.

11. Method for replacing an implantable medical device with an implantable medical replacement device, wherein a command signal is sent with a programming device to the implantable medical device to change an address of the implantable medical device to a new address being different from an address of the implantable medical replacement device to allow independent communication of the programming device with both the implantable medical device and the implantable medical replacement device, and wherein an activation command signal is sent with the programming device to the implantable medical replacement device to activate the implantable medical replacement device to assume a passive state in which the implantable medical replacement device is configured to sense cardiac events of a heart of a patient, but is prevented from applying pacing pulses to the heart, and wherein after having activated the replacement device to assume said passive state, a further command signal is sent with the programming device to the implantable medical replacement device to let the implantable medical replacement device apply pacing pulses to the heart for a pre-determined number of cardiac cycles, and wherein a suspension command signal is sent with the programming device to the new address of the implantable medical device to suspend application of pacing pulses of the implantable medical device to the heart for a predetermined number of cardiac cycles, and wherein a deactivation command signal is sent with the programming device to the new address of the medical device in case capture of the heart is detected by the implantable replacement device with respect to the pacing pulses applied by the implantable medical replacement device, so that the implantable medical device is deactivated, and wherein an activation command signal is sent to the implantable medical replacement device with the programming device to activate the implantable medical replacement device to start to apply pacing pulses to the heart.

12. The method according to claim 11, wherein a programming device sends a command signal to the implantable medical replacement device to change the address of the implantable medical replacement device to one distinct from the address of the medical device.

13. A method for replacing an implantable medical device with an implantable medical replacement device, wherein a command signal is sent with a programming device to the implantable medical device to change an address of the implantable medical device to a new address being different from an address of the implantable medical replacement device to allow independent communication of the programming device with both the implantable medical device and the implantable medical replacement device, a further command signal is sent with the programming device to the implantable medical replacement device, wherein the further command signal is configured to let the implantable medical replacement device apply pacing pulses to the heart of the patient for a predetermined number of cardiac cycles, and wherein a permanent deactivation command signal is sent with the programming device to the new address of the implantable medical device in case a capture of a patient's heart is acknowledged or confirmed by the implantable medical replacement device.

14. The method according to claim 13, wherein before the further command signal is sent, which is configured to let the implantable medical replacement device apply pacing pulses, an activation command signal is sent with the programming device to the implantable medical replacement device to activate the implantable medical replacement device to assume a passive state in which the implantable medical replacement device is configured to sense cardiac events of a heart of a patient, but is prevented from applying pacing pulses to the heart.

15. The method according to claim 13, wherein before the permanent deactivation command signal is sent to the new address of the implantable medical device, a suspension command signal is sent with the programming device to the new address of the implantable medical device to suspend application of pacing pulses of the implantable medical device to the heart for a predetermined number of cardiac cycles, and wherein a further activation command signal is sent to the implantable medical replacement device with the programming device to activate the implantable medical replacement device to start to apply pacing pulses to the heart when the implantable medical device is deactivated.

16. The method according to claim 13, wherein a programming device sends a command signal to the implantable medical replacement device to change the address of the implantable medical replacement device to one distinct from the address of the medical device.

\* \* \* \* \*